United States Patent
Sormunen et al.

(10) Patent No.: US 7,506,381 B2
(45) Date of Patent: Mar. 17, 2009

(54) METHOD FOR SECURING AN ELECTRONIC DEVICE, A SECURITY SYSTEM AND AN ELECTRONIC DEVICE

(75) Inventors: Toni Sormunen, Lempäälä (FI); Risto Ronkka, Tampere (FI); Antti Kiiveri, Oulu (FI)

(73) Assignee: Nokia Corporation, Espoo (FI)

( * ) Notice: Subject to any disclaimer, the term of this patent is extended or adjusted under 35 U.S.C. 154(b) by 757 days.

(21) Appl. No.: 10/173,569

(22) Filed: Jun. 14, 2002

(65) Prior Publication Data
US 2003/0014663 A1    Jan. 16, 2003

(30) Foreign Application Priority Data
Jun. 15, 2001    (FI)    ................................. 20011278

(51) Int. Cl.
G06F 21/22    (2006.01)
G06F 9/00     (2006.01)
H04L 9/00     (2006.01)

(52) U.S. Cl. .................... 726/30; 726/17; 713/1; 713/176; 705/56

(58) Field of Classification Search .............. 713/1, 713/189
See application file for complete search history.

(56) References Cited

U.S. PATENT DOCUMENTS

| | | | |
|---|---|---|---|
| 5,131,091 A | 7/1992 | Mizuta | 395/725 |
| 5,293,610 A | 3/1994 | Schwarz | 395/425 |
| 5,379,342 A * | 1/1995 | Arnold et al. | 380/2 |
| 5,643,086 A | 7/1997 | Alcorn | |
| 5,802,592 A | 9/1998 | Chess et al. | 711/164 |
| 5,918,047 A * | 6/1999 | Leavitt et al. | 713/2 |
| 5,919,257 A | 7/1999 | Trostle | 713/200 |
| 6,026,293 A * | 2/2000 | Osborn | 455/411 |
| 6,032,257 A | 2/2000 | Olarig et al. | 713/200 |
| 6,405,311 B1 * | 6/2002 | Broyles et al. | 713/2 |

(Continued)

FOREIGN PATENT DOCUMENTS

EP    0606771 A2    7/1994

(Continued)

OTHER PUBLICATIONS

Patent Abstracts of Japan, Publication No. 06-236280, Data Verification Reinforcing Method and it's Method, published Aug. 23, 2004.

(Continued)

*Primary Examiner*—Christopher A Revak
(74) *Attorney, Agent, or Firm*—Banner & Witcoff, Ltd.

(57) ABSTRACT

The disclosure describes a method for securing the trustworthiness of an electronic device. At least first and second check-up data are stored in the electronic device. In the method, a first step of a boot program is executed. In the first boot step, the trustworthiness of the first check-up data is examined, wherein if the check-up shows that the first check-up data is trusted, the second check-up data related to the second boot step is examined to confirm the trustworthiness of the second boot step. If the check-up shows that the second check-up data related to the second boot step is trusted, the second boot step is executed after said first boot step.

40 Claims, 6 Drawing Sheets

U.S. PATENT DOCUMENTS

| | | | |
|---|---|---|---|
| 6,470,457 B1 * | 10/2002 | Brewer et al. | 713/324 |
| 6,584,561 B1 * | 6/2003 | Merkin et al. | 713/2 |
| 6,625,729 B1 * | 9/2003 | Angelo et al. | 713/2 |
| 6,625,730 B1 * | 9/2003 | Angelo et al. | 713/2 |
| 6,735,696 B1 * | 5/2004 | Hannah | 713/189 |
| 7,000,249 B2 * | 2/2006 | Lee | 726/20 |
| 7,073,064 B1 * | 7/2006 | Angelo et al. | 713/176 |
| RE39,368 E | 10/2006 | Alcorn | |
| 7,409,539 B2 * | 8/2008 | Arnez et al. | 713/100 |
| 2006/0212691 A1 * | 9/2006 | Wood et al. | 713/1 |
| 2006/0265581 A1 * | 11/2006 | Sun et al. | 713/1 |
| 2007/0033387 A1 * | 2/2007 | Arnez et al. | 713/1 |
| 2008/0086629 A1 * | 4/2008 | Dellow | 713/2 |

FOREIGN PATENT DOCUMENTS

| | | |
|---|---|---|
| EP | 0656587 A1 | 6/1995 |
| EP | 0816970 A2 | 1/1998 |
| EP | 816970 A2 * | 1/1998 |
| EP | 1076279 A1 | 2/2001 |
| GB | 2121569 | 12/1983 |
| WO | 9857509 | 12/1998 |
| WO | 0077597 | 12/2000 |

OTHER PUBLICATIONS

Patent Abstracts of Japan, Publication No. 11-169546, Monitoring System of Game Device, published Jun. 29, 1999.

Patent Abstracts of Japan, Publication No. 10-333902, Computer System with Alterations Detecting Function, published Dec. 18, 1998.

PCT International Preliminary Examination Report in application No. PCT/FI2002/000517, dated Sep. 16, 2003.

PCT Written Opinion in application No. PCT/FI2002/000517, dated Dec. 5, 2003.

Notice to Submit Response in Korean application No. 10-2003-7016192, dated Nov. 30, 2005.

Notice of Reasons for Rejection in Japanese application No. 2003-505748, dated May 30, 2006.

Decision of Final Rejection in Japanese application No. 2003-505748, dated Feb. 13, 2007.

* cited by examiner

METHOD FOR SECURING AN ELECTRONIC DEVICE, A SECURITY SYSTEM AND AN ELECTRONIC DEVICE

TECHNICAL FIELD OF THE INVENTION

The present invention relates to a method for securing an electronic device, a security system and an electronic device The present invention relates to a method for securing the trustworthiness of an electronic device, in which electronic device at least first and second check-up data are stored, in which method the start-up of a boot program is performed. The invention also relates to a system for securing the trustworthiness of an electronic device, in which electronic device at least first and second check-up data are stored, and the electronic device comprises means for starting a boot program. The invention further relates to an electronic device comprising means for securing the trustworthiness of an electronic device, in which electronic device at least first and second check-up data are stored, and the electronic device also comprises means for starting a boot program. The invention also relates to a program for securing the trustworthiness of an electronic device, in which electronic device at least first and second check-up data are stored, and which program includes program commands for performing the start-up of a boot program, as well as a storage means for storing a program used for securing the trustworthiness of an electronic device, in which electronic device at least first and second check-up data are stored, and which program includes program commands for performing the start-up of a boot program.

BACKGROUND OF THE INVENTION

A variety of electronic devices apply programmable control means, such as microprocessors, microcontrollers, programmable logics, and/or application-specific programmable integrated circuits. Such electronic devices contain stored software consisting of one or more programs containing e.g. program commands required for the operation of the electronic device. In the storage of such software, a memory is used, of which at least a part is a non-volatile memory, i.e. the content of the memory is retained even if the operating voltage of the memory is cut off. Such memories include for example a read-only memory (ROM), a programmable ROM (PROM) and an electrically erasable PROM (EEPROM). At least a part of the memory is normally integrated in the electronic device, but in addition, the memory can be increased in many applications by means of, for example, a memory expansion board. One such memory expansion board is the so-called Flash memory card. The Flash memory is a kind of EEPROM type memory whose content can be changed by electrical programming. The contents of the Flash memory will be retained even after the cutting off of the operating voltages. By means of such an expansion memory, it is easy to provide the electronic device with new software, memory capacity for storing, for example, photographs in a digital camera, for setting access rights e.g. in a mobile station, etc. The installation of software in an electronic device can also be performed, in a way known as such, by using other storage means, such as a diskette, a CD-ROM, or a DVD.

It is relatively easy to copy software stored on storage means, wherein software providers have developed various methods to prevent the use of copied software. One such method is to use a product ID or the like. Thus, upon starting the program, the user must enter this product ID in the electronic device before the program can be used. However, a problem with such an arrangement is that in connection with copying of the program, the user may have obtained this product ID from the owner of the original software, and also the copied program can then be used. On the other hand, even if the user of the copied software did not know the product ID, the user may try to find out the structure of the program protection, for example by reverse engineering or debugging, wherein the object code of the program is converted to the source code. Thus, the user may succeed in decrypting the copy protection and in modifying the program, for example, in such a way that the copy protection is off, or in such a way that the user resolves the required product ID on the basis of the object code. To make such a possibility more difficult, programs have been developed, in which it is checked at intervals, during the running of the program, that the program has not been tampered with. Thus, the mere decryption of the copy protection upon the booting does not necessarily make it possible to use the copied software for a longer time, unless the user is capable of determining the structure of such copy protection.

It is known to connect a given program unequivocally to a given device in such a way that the program cannot be used in another device. This can be done, for example, by modifying the software on the basis of the hardware-specific serial number or by supplying an installation program which is only functionable in one device on the basis of the hardware-specific serial number. These solutions have the drawback that this protection can be broken up by modifying either the software or the hardware.

To aggravate debugging, an attempt can be made to complicate at least the copy protection part and/or the storage of the product ID in connection with the program code, wherein it becomes more difficult to break up the copy protection. One such solution is presented e.g. in the international patent application WO 00/77597.

The U.S. Pat. No. 5,131,091 presents a method in which a program stored on a memory card is protected by scrambling the content of the program code with XOR operations. In the scrambling, an encryption bit string stored in a non-volatile memory is used, and finding out the string has been made as difficult as possible. A different encryption bit string is used on memory cards supplied to different users.

A user who has legally acquired the software may also need to secure the origin of the software, because in some cases, a third party may attempt to supply versions modified from original programs and to market them as original programs. Such software may contain, for example, an added virus, or the software is provided with a so-called back door, through which the manufacturer of the modified software may even have access to the local area network of a firm which has installed this modified software. In some cases, the modified software is provided with the property of transmitting, for example, user identifications and passwords entered by the user in the electronic device e.g. via a data network such as the Internet to the manufacturer of the modified software, without the user noticing this. To secure the origin of the software, the program can be provided with a digital signature, on the basis of which the user can establish the authenticity of the original software.

In addition to the copy protection of programs, there is also a need to protect other information stored in connection with electronic devices, to prevent misuse. For example, the restriction of access rights to a specific user or specific users is, in connection with some electronic devices, arranged so that the user has a personal smart card, wherein, to use the electronic device, the user inserts the smart card in a card connector provided in the electronic device. As auxiliary authentication, it is also possible to use a user identification, wherein upon turning on of the electronic device, the user must enter this user identification before the electronic device can be used. Such an arrangement is applied e.g. in many mobile communication networks, such as the GSM mobile communication network and the UMTS mobile communication network. In a mobile station to be used in such a mobile communication network, a smart card is inserted, which is called a SIM (Subscriber Identity Module) in the GSM system and a USIM (Universal Subscriber Identity Module) in the UMTS system. In such a smart card, the service provider of the mobile communication network has already set certain subscriber specifications, such as the International Mobile Subscriber Identifier (IMSI). The user identification is also stored in this smart card, wherein the smart card checks the user identification when the mobile station is turned on.

However, the above-presented solutions do not solve the problem that a third party modifies the software in such a way that it can use it itself either in another device or change the operation of the program in this device. Such a problem has come up e.g. in connection with mobile stations, in which it has been possible to access the services of a mobile communication network free of charge by making a copy of a mobile station. The software and the international mobile equipment identity (IMEI) of the copied mobile station are identical with those in the original mobile station. A copy is also made of the smart card which is installed in the copied mobile station. Thus, the mobile switching centre does not distinguish between the original mobile station and the copied one.

Yet another drawback in the prior art encryption solutions of software and other data is that if the same encryption key is used for encrypting large quantities of information, the decryption of the encryption key may be successful by analyzing such encrypted information.

With an increase in the data processing capabilities of portable devices, more information can be stored in them, which may also be confidential or otherwise such information that must not be revealed to an outsider. The carrying of portable devices will, however, increase the risk that the portable device is lost or stolen, wherein an attempt must be made to protect the information stored in it with an encryption method. For portable devices, it is normally possible to determine a password which the user must enter in the device at the stage of turning on, until the device can be normally used. However, such a protection is relatively easy to pass, because the passwords used are normally relatively short, typically having a length of less than ten characters. On the other hand, even if no attempt were made to find out the password, the information contained in the device can be accessed, for example, by transferring the storage means, such as a fixed disk, into another device. If the information contained in the storage means is not in encrypted format, the information stored in the storage means can be easily found out.

It is known that information needed by the user or the device can be encrypted with one key, the encrypted information can be stored in the memory of the device, and it can be decrypted with another key. The key used in asymmetric encryption is different from the key used in decryption. Correspondingly, the key used in symmetric encryption is the same as the key used in decryption. In asymmetric encryption, these keys are normally called a public key and a personal key. The public key is intended for encryption and the personal key is intended for decryption. Although the public key may be commonly known, it can normally not be used to easily determine the personal key corresponding to the public key, wherein it is very difficult for an outsider to find out information encrypted with this public key. One example of a system based on the use of such a public key and a personal key is the PGP system (Pretty Good Privacy), in which the user encrypts the information to be transmitted with the public key of the receiver, and the receiver will then open the encrypted information with his/her personal key. However, there are considerable drawbacks in the systems of prior art. Effective symmetric keys consist of about 100 bits, whereas asymmetric keys consist of about 1000 to 2000 or even up to 4000 bits. If the key string is too short, it is relatively easy to break up with modern data processing equipment which has been called the brute force attack. This problem is particularly significant in portable data processing and communicating devices, in which also the limited processing capacity prevents the use of long keys.

SUMMARY OF THE INVENTION

It is an aim of the present invention to provide an improved method for securing an electronic device in such a way that a given program is set to function in a given electronic device only. The invention is based on the idea that the boot-up is set to consist of at least two steps in such a way that in the first step, first check-up data is verified, and if the first check-up data is correct, second check-up data related to the second booting step is verified, wherein if also the second check-up data is correct, it is possible to start the second booting step.

More precisely, a method for securing the trustworthiness of an electronic device, in which electronic device at least first and second check-up data are stored, in which method the start-up of a boot program is performed, according to a first aspect of the present invention, is primarily characterized in that, in the boot program, at least first and second check-up data are stored, in which method the start-up of a boot program is performed, wherein in the boot program, at least first and second boot steps are taken, that in the first boot step, the trustworthiness of at least said first check-up data is examined, wherein if the check-up shows that said at least first check-up data is trusted, at least said second check-up data related to the boot step is examined to confirm the trustworthiness of the second boot step, wherein if the check-up shows that said at least one second check-up data related to the second boot step is reliable, said second start-up step is taken after said first boot step.

A system for securing trustworthiness of an electronic device, in which device at least first and second check-up data are stored, and the device comprises means for starting a boot program, according to a second aspect of the present invention, is primarily characterized in that the system further comprises means for starting a boot program, wherein the system comprises means for running the boot program in at least first and second boot steps, means for examining the trustworthiness of at least said first check-up data in said first boot step, and means for examining said second check-up data related to at least a second start-up step to confirm the trustworthiness of the second boot step, wherein if said at least first check-up data and said at least one second check-up data related to the second boot step are reliable on the basis of said check-ups, said second boot step is arranged to be performed after said first boot step.

An electronic device comprising means for securing trustworthiness of an electronic device, in which device at least first and second check-up data are stored, and the device comprises means for starting a boot program, according to a third aspect of the present invention, is primarily characterized in that the electronic device comprises means for running the boot program in at least first and second boot steps, means for examining the trustworthiness of at least said first check-up data in said first boot step, and means for examining said second check-up data related to at least a second boot step to confirm the trustworthiness of the second boot step, wherein if said at least first check-up data and said at least one second check-up data related to the second boot step are reliable on the basis of said check-ups, said second boot step is arranged to be performed after said first boot step.

Further, the software for securing the trustworthiness of an electronic device, in which at least first and second check-up data are stored, and which software includes program commands for performing the start-up of a boot program, according to a fourth aspect of the present invention, is primarily characterized in that the software also comprises program commands for performing at least first and second boot steps in the boot program, program commands for examining the trustworthiness of at least said first check-up data in the first boot step, program commands for examining at least said second check-up data related to the second start-up step to secure the trustworthiness of the second boot step, program commands for performing said second boot step after said first boot step if said at least first check-up data and said at least one second the check-up data related to the second boot step are reliable on the basis of said check-ups.

Further, the storage means for storing a program used for securing the trustworthiness of an electronic device, in which electronic device at least first and second check-up data are stored, and which program includes program commands for performing the start-up of a boot program, according to a fifth aspect of the present invention is primarily characterized in that the program stored in the storage means also comprises program commands for performing at least first and second boot steps in the boot program, program commands for examining the trustworthiness of at least said first check-up data in the first boot step, program commands for examining at least said second check-up data related to the second boot step to secure the trustworthiness of the second boot step, program commands for performing said second start-up step after said first boot step if said at least first check-up data and said at least one second check-up data related to the second boot step are reliable on the basis of said check-ups.

The present invention shows remarkable advantages compared to solutions of prior art. In the electronic device according to the invention, the equipment identity is stored in a memory which is made as difficult as possible to modify. Furthermore, in an advantageous embodiment, the equipment identity is verified with a digital signature, wherein the public key or some key identification information used in the verification is stored in the electronic device. Thus, by checking the digital signature, it is possible to verify, with a high probability, whether the digital signature corresponds to the equipment identity of the electronic device. One equipment identity is set permanently in the device and another is set in the signed data which is called a certificate. Now, by checking the signature, it is possible to find out the authenticity and author of the certificate. It is thus verified that the permanent equipment identity of the device and the equipment identity contained in the certificate are identical. By the method according to the invention, it can be secured that only a given program operates in a specific electronic device. It is thus possible to significantly reduce the economic losses to program providers, caused by the copying of software. It is also possible to improve the position of the users of electronic devices, because, by the solution of the invention, the operation of pirate electronic devices and software can be made significantly more difficult. Thus, the authorized user will not be charged any costs for the use of such a copied electronic device which corresponds to the user's electronic device. By the method of the invention, the origin of the software can be verified, wherein the user of the software can be relatively sure that the origin of the software corresponds to that indicated, and that the software does not contain any viruses, back doors, or the like. The invention also makes it possible that the software of the electronic device cannot be modified in an unauthorized manner so that it would function after the modifications.

In the electronic device according to the invention, the size of the internal read-only memory of the circuit can be kept relatively small, because the integrity of the programs on the external memory (flash or some other type if memory) can be verified inside the chip. This also makes it possible that a majority of the programs of the electronic device can also be replaced after the manufacture of the electronic device, and also the planning of the programs is easier.

In an advantageous embodiment of the invention, the equipment identity used in the control of the access rights of the programs is independent of the possible IMEI code of the electronic device. Thus, the manufacturer of the device may change the IMEI code, if necessary. Furthermore, the length of the equipment identity can be shorter than the IMEI, wherein upon storing the equipment identity, a smaller quantity of expensive memory capacity will be required than when applying solutions of prior art.

DESCRIPTION OF THE DRAWINGS

In the following, the invention will be described in more detail with reference to the appended drawings, in which.

DETAILED DESCRIPTION OF THE INVENTION

The following is a description on the operation of an electronic device 1 according to an advantageous embodiment of the invention in connection with the method of the invention. The electronic device 1 used can be any electronic device which contains means for running programs. Advantageously, the electronic device 1 preferably comprises operating system software or the like, by which the essential functions of the electronic device are controlled and by which the running of other programs (applications) can be controlled in the electronic device 1. Non-restrictive examples of such electronic devices 1 to be mentioned in this context are a mobile station and a computer.

Figure 1:
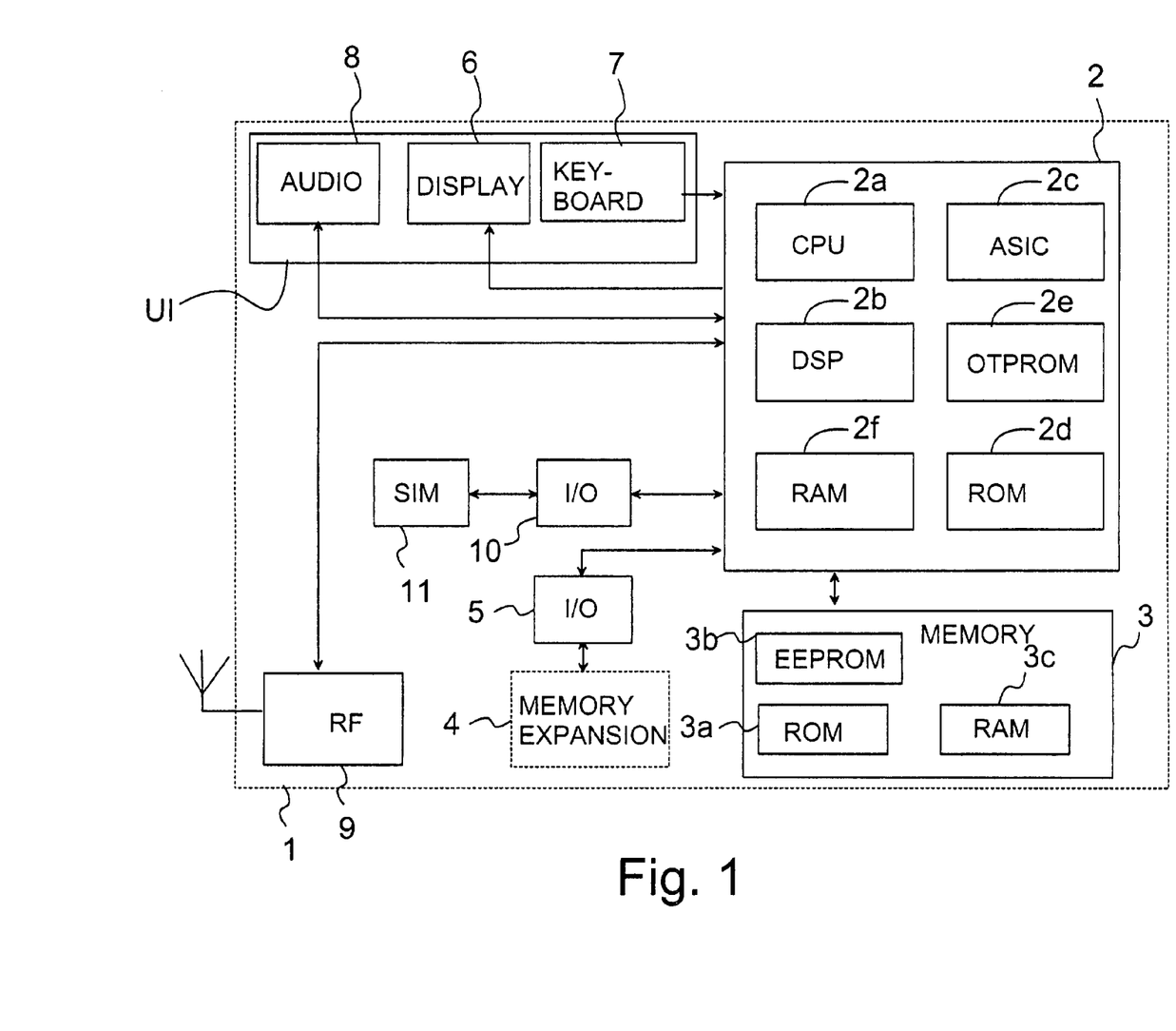
FIG. 1 shows an electronic device according to a preferred embodiment of the invention in a simplified block diagram.

The electronic device 1 according to an advantageous embodiment of the invention, shown in FIG. 1, comprises a control block 2 containing means 2a for running programs. These means comprise, for example, a central processing unit CPU. A digital signal processing unit DSP 2b may also be included. In addition, the control block 2 preferably comprises an application specific integrated circuit ASIC 2c, in which it is possible to implement, for example, at least part of the logic functions of the electronic device. Furthermore, the control block 2 of the electronic device 1 shown in FIG. 1 is preferably provided with a read-only memory 2d, of which at least a part is a one time programmable ROM (OTPROM) 2e, and a random access memory 2f. However, it is obvious that these memories 2d, 2e, 2f can also be implemented as memories separate from the control block 2. The electronic device also comprises memory means 3 outside the control block, preferably comprising at least a read-only memory 3a, a programmable read-only memory 3b and a random access memory 3c. At least a part of the read-only memory 3a is implemented in such a way that its content cannot be changed by the user. It is also possible to connect a memory expansion to the electronic device 1 of FIG. 1, by placing a memory expansion block 4 in memory connection means 5. The memory expansion block 4 is, for example, a Flash memory card, but also other memory expansion means can be applied in connection with the invention. Preferably, the electronic device 1 is also provided with a user interface UI which comprises a display 6, a keyboard 7, and audio means 8, such as an earpiece/a speaker and a microphone. The electronic device 1 according to an advantageous embodiment of the invention, shown in FIG. 1, also comprises means 9 for performing mobile station functions, for example a GSM mobile station and/or a UMTS mobile station. Furthermore, the electronic device 1 preferably comprises means 10 for connecting an identity card 11, such as a SIM card and/or a USIM card, to the electronic device 1.

Figure 2:
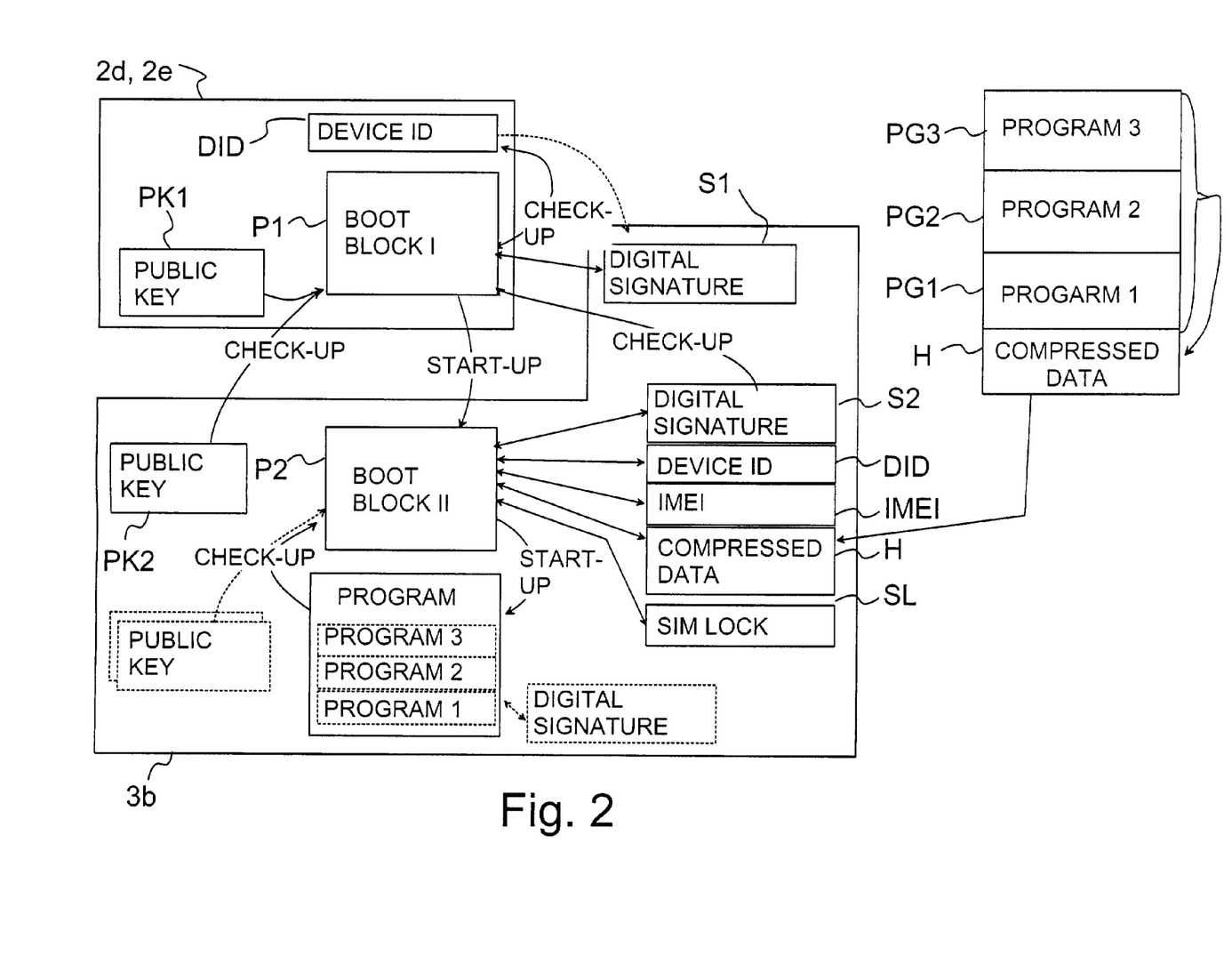
FIG. 2 shows the structure of a boot program in an electronic device applying the method according to an advantageous embodiment of the invention.

FIG. 2 shows the structure of the boot program of the electronic device 1, in which the method according to an advantageous embodiment of the invention is applied. The boot program is divided into at least two boot blocks P1, P2, of which the first boot block P1 performs the initial booting operations of the first step. The second boot block P2 performs further check-ups in a situation in which no errors to prevent the start-up were detected in the first boot block.

The security method according to the present invention, consisting of at least two steps, functions in the following way. The operation is illustrated in the flow chart of FIG. 5. In the start-up of the electronic device 1, the control block 2 starts to run the boot program (block 501 in FIG. 5). This is performed in a way known as such by setting the address register of the control block 2 to a given initial address containing that program command of the boot program which is to be performed first. This program command is located in a first boot block P1. After this, the running of the program is preferably continued by taking the required steps for initializing the device, which are prior art known by anyone skilled in the art and do not need to be discussed in this context. The first boot block P1 comprises a first check-up step to check first check-up data (first security data). In the first check-up step e.g. the device ID or the like stored in the one time programmable ROM 2d will be checked (block 502). This device ID is indicated by the reference DID in FIG. 2. Furthermore, it is possible to check that the program code of the first boot block P1 has not been modified. The checking is preferably performed in the control block 2 by computing a digital signature by using at least said device identity DID and possibly also at least part of the boot program stored in the read-only memory 2d, 2e. In the computing of the digital signature, the same algorithm and the same data are used, by which the digital signature was computed in connection with the manufacture of the electronic device 1 by a secret key of the device manufacturer, as will be presented below in this description. This digital signature is preferably stored in the programmable read-only memory 3b (indicated with reference S1 in FIG. 2), but it is obvious that it can also be stored, for example, in the same read-only memory 2d, 2e in which the device identity DID has been stored. The digital signature can be verified by using the public key PK1 which corresponds to the secret key used in the signature and is stored in the read-only memory 2d, 2e. After the computing of the digital signature, a comparison is made between the digital signature computed in the control block 2 and the digital signature S1 stored in the one time programmable read-only memory 2d, 2e (block 503). If the comparison shows that the digital signatures match, it is possible to continue the booting. In other cases, it is obvious that an attempt has been made to modify the electronic device 1 and/or the identity data DID contained in it and/or the boot program, wherein as a result, the normal operation of the device is prevented, for example by switching off the electronic device (block 504). This part of the boot program which makes the checking is stored in the memory of the electronic device 1 in such a way that it cannot be changed without breaking the electronic device 1. One useful solution is to use the internal, one time programmable read-only memory 2e of the control block 2 for the storage. When the booting is continued, the next step is to take the second check-up step of the boot program before starting any other programs PG1, PG2, PG3. The program code corresponding to the second check-up step is in the first boot block P1. In the second check-up step, the authenticity of the second boot block P2 of the boot program is checked. The second boot block P2 of the boot program is preferably stored in the electrically erasable programmable read only memory (EEPROM) 3b, such as a Flash memory. A digital signature is computed by using at least part of the boot program stored in the read-only memory 3a, 3b (block 505). Also the digital signature S2 of the second boot block of the boot program is stored in the same memory 3b. The computation of this digital signature S2 applies some data that can be verified, such as a part of the program code of the second boot block of the boot program as well as the secret key of the manufacturer of the electronic device 1. The public key PK2 corresponding to this secret key is also stored in the memory 3b. The computed digital signature is compared with the digital signature stored in the memory 3b (block 506), and if the signatures match, the booting of the electronic device 1 can be continued further. However, if the signatures do not match, the normal operation of the device is prevented, for example by halting the electronic device.

Figure 5:
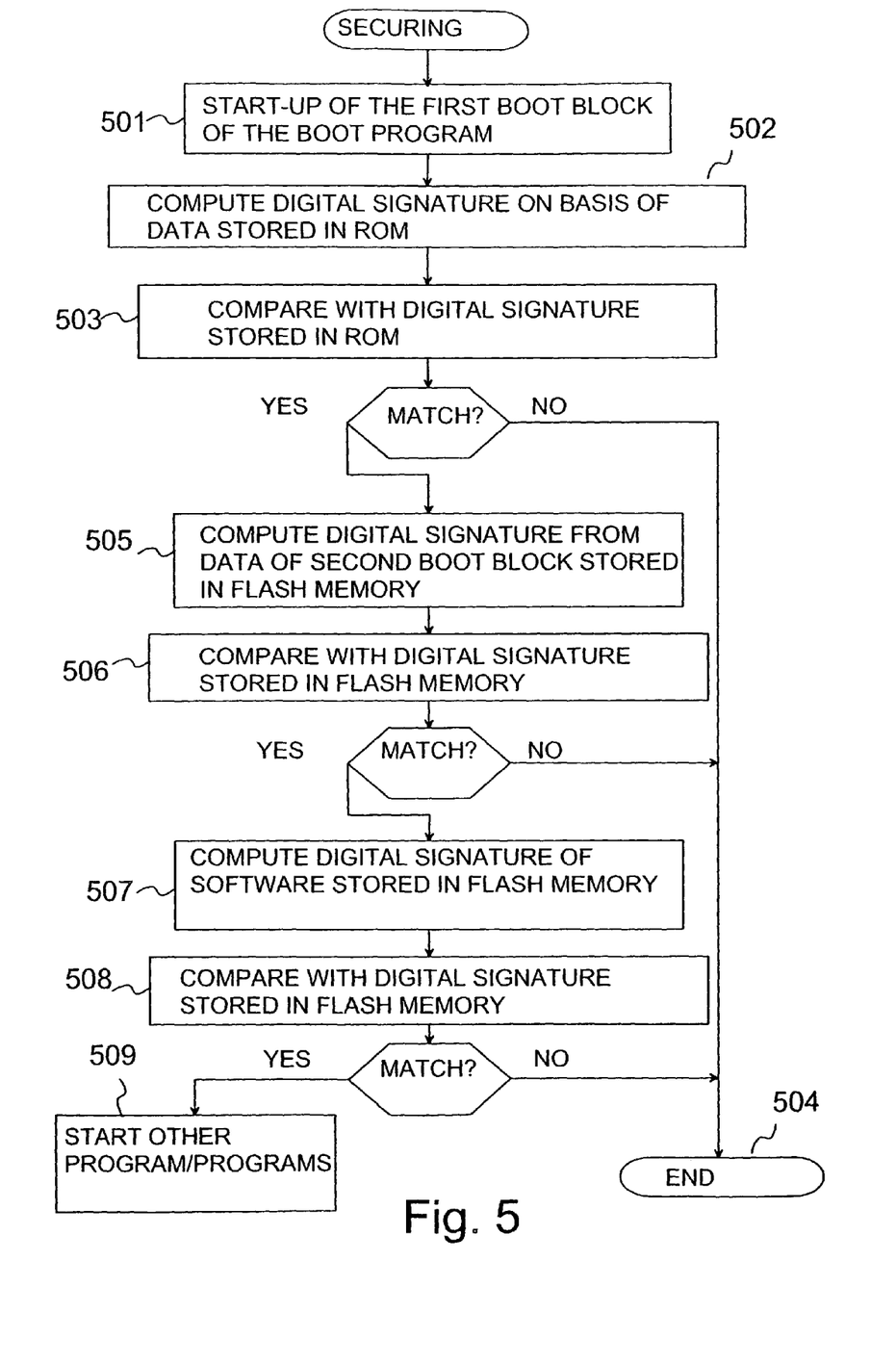
FIG. 5 shows the operation of a boot program according to a preferred embodiment of the invention in a flow chart.

The data to be checked (second check-up data, second security data) in the second check-up step may have been formed, for example, by computing compressed data H, e.g. by a hash function, from programs PG1, PG2, PG3, parameters, device identities DID, IMEI, or the like, stored in the programmable read-only memory 3b. This compressed data H is signed with the secret key and stored in the programmable read-only memory 3b. In this case, the checking is performed by verifying the authenticity of this signature.

In an advantageous embodiment of the invention, information is transmitted from the first boot step to the program performing the second boot step, about the location of the check-up program to be used in the second boot step and the public key PK2.

After the above-presented second check-up step has been successful, it is possible to run the second boot block P2 of the boot program stored in the memory 3b. In this second boot block P2 of the boot program, e.g. some other data stored in the read-only memory 3b is verified, e.g. according to the above-presented principles by computing one or more digital signatures (block 507) and comparing it/them with the corresponding digital signatures stored in the read-only memory (block 508). Such data to be verified include, for example, device-specific information, such as the device identity DID, the international mobile equipment identity IMEI, as well as service provider specific information, such as a SIM lock SL, whereby the mobile station can be set to operate with only one or more specific SIM/USIM cards, and/or an operator lock, whereby the electronic device 1 is set to operate with a SIM/USIM card of a specific mobile telephone operator only. The running of the second boot block P2 of the boot program can be continued, if the signatures and other possibly performed verifications were in order. It should be mentioned that in some applications, the above-mentioned device identity DID may be formed on the basis of the international mobile equipment identity IMEI, but they may also be independent of each other.

Next, at least another check-up step is to be taken to examine the still unverified part of the program code of the programs PG1, PG2, PG3, or at least some of them (block 509). In this check-up step, it is possible to apply the above-presented principles, wherein at least another digital signature and the information required for its verification are stored in the memory 3b.

After all the verifications determined for starting the electronic device 1 have been performed, it is possible to boot other programs PG1, PG2, PG3, after which the electronic device 1 can be used normally.

The above-presented public keys can also be verified with a digital signature (=certificate) to obtain greater certainty of the origin of the public keys. In this case, not only the public keys but also the corresponding digital signatures are stored in the memory 2d, 2e, 3b and verified before they are used for other check-up measures.

Although, in the above description, the boot program was only divided in the first P1 and second P2 boot blocks, it is obvious that in connection with the invention, the boot program can also be divided into more than two boot blocks P1, P2. Thus, each boot block involves verification of at least the next boot block, before the operation moves on to the next boot block. In the verification, information is used, of which at least a part is stored in this boot block next in the order.

The above-described verifications can also be made after the booting, during the normal operation of the electronic device 1. The aim of this is to prevent, for example, the replacement of the smart card, after the booting, with a smart card whose use in said electronic device 1 is unauthorized, or the replacement of the external memory 3b with a memory containing a modified program code.

Figure 3:
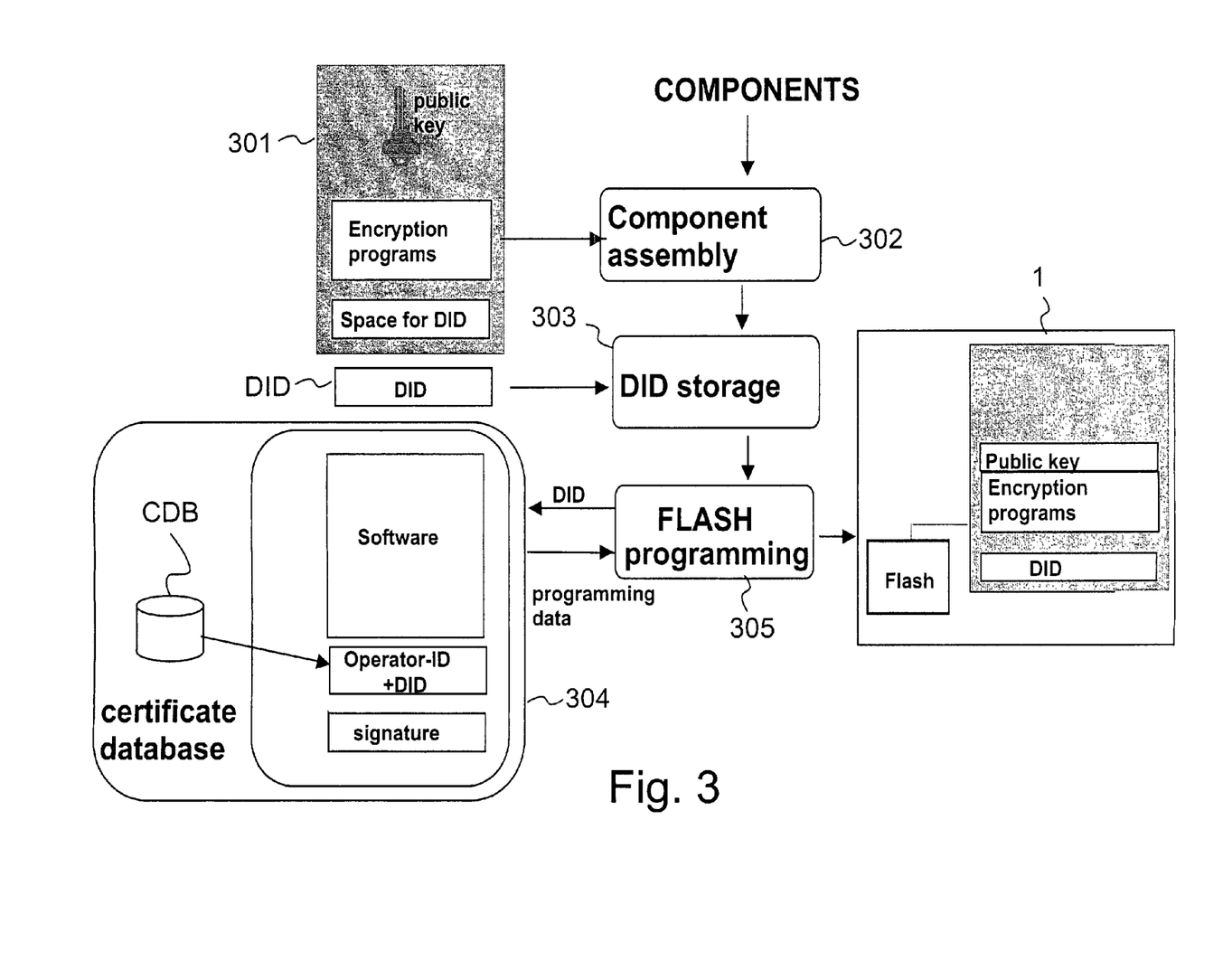
FIG. 3 illustrates the manufacturing and delivery of software to an electronic device by a security system according to an advantageous embodiment of the invention.

At the stage of manufacturing of the electronic device 1 according to the invention, and/or at the stage of updating the software, the required check-up data and programs are formed in the memory 2d, 2e, 3a, 3b preferably in the following way. The program codes required in the verifications are stored in the control block 2, including the first boot block P1 of the boot program, the program for computing the digital signature, and the encryption and decryption algorithm/algorithms. This step is represented by block 301 in FIG. 3. The manufacturer also stores at least a part of the device identity DID in the one time programmable memory 2e of the control block (block 303). Furthermore, the public key PK1 of the manufacturer and the digital signature S1, required for the verification of the first boot block P1 and the device identity, are stored in the one time programmable memory 2e. After performing the necessary storage in the one time programmable memory 2e, this one time programmable memory 2e is set, if necessary, in a state in which no more changes can be made in the memory. The aim of this is to prevent the changing of, e.g. single bits in the device identity DID or in another part of the one time programmable read-only memory 2e. At the stage of assembling the components (block 302), also the control block 2 containing the one time programmable memory 2e is installed in the circuit board of the electronic device (not shown). The manufacturer stores the other blocks P2 of the boot program and possible application programs e.g. in the programmable memory 3b and/or in the one time programmable memory 3a (blocks 304 and 305). Also the public key PK2 of the manufacturer used for checking the second boot block P2 of the boot program, the digital signature S2 as well as a possible certificate are stored in the memory 3b. After this, the electronic device 1 can be delivered to a dealer or a service provider, such as a mobile telephone operator. Thus, when a purchaser of the electronic device 1 enters a subscriber contract with the service provider, the electronic device 1 can be set to function with one or more smart cards 11, such as a SIM card, or any smart card of the service provider. Thus, the service provider or the seller sets a SIM lock SL or the like as well as the device identity IMEI in the electronic device 1. If necessary, a certificate is retrieved from a certificate data base CDB, to be used for verification of the authenticity of the data in connection with the booting of the electronic device 1 in a way described above in this description. These definitions are stored in the memory 3, preferably in the programmable memory 3b. After this, the electronic device 1 is ready for use. It is obvious that the operations provided by the dealer/service provider above can also be performed by the device manufacturer or a service company authorized by the device manufacturer. Thus, the data about the service provider and the purchaser are transmitted to the enterprise at which the data are stored.

On the basis of the above-described confirmation data, the service provider can make sure that the electronic device 1 according to the invention, being connected to the services of the service provider, really is the device whose identity code is stored in the electronic device 1. Furthermore, it is guaranteed that the electronic device 1 and the data contained in it have not been subjected to unauthorized modification.

Figure 4:
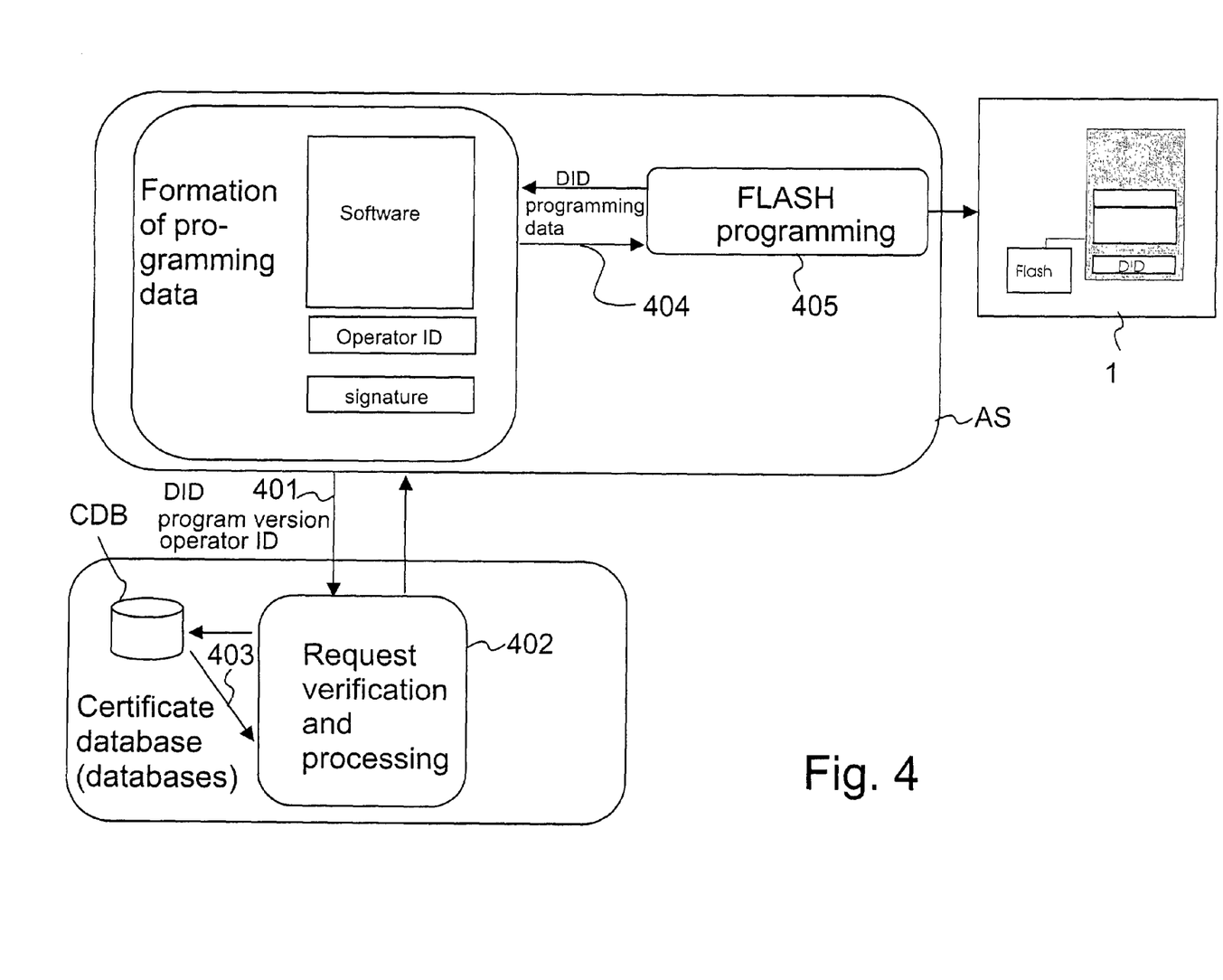
FIG. 4 illustrates the manufacturing and delivery of software to an electronic device by a security system according to another advantageous embodiment of the invention.

The invention can also be applied to update software and other data in the electronic device 1. This can be implemented, for example, by the dealer and/or a service company, e.g. with the arrangement shown in FIG. 4. For example, the user wants to have a new version of the operating system to be installed in the electronic device 1. The new operating system version has been supplied by the provider of the operating system to said enterprise AS, or it is downloaded via a data network from the provider of the operating system. In connection with the downloading, the device identity DID is preferably given, and possibly also the identity of the service provider (block 401 in FIG. 4). When downloading the operating system, the necessary verifications are made that the receiver is really authorized to the downloading and that the user is authorized to receive the new version of the operating system in his/her electronic device (block 402). The operating system to be downloaded can now be provided with the data about the device identity DID, the public key of the program provider, and/or a digital signature (arrow 403), wherein the running of the operating system version can be limited to said electronic device 1 only. Thus, no other copy protection will be necessary. The new operating system version is transmitted to the electronic device 1 (arrow 404), to be stored in the programmable memory 3b by a method known as such (block 405).

There are a number of encryption methods known which can be applied in connection with the present invention. Symmetric encryption methods to be mentioned in this context include Data Encryption Standard (DES), Advanced Encryption Standard (AES), and Rivest's Cipher 2 (RC2). One asymmetric encryption method is Rivest, Shamir, Adleman (RSA). Also so-called hybrid systems have been developed, employing both asymmetric encryption and symmetric encryption. In such systems, asymmetric encryption is normally used when an encryption key to be used in symmetric encryption is transmitted to the receiver, wherein the symmetric encryption key is used in the encryption of actual information.

For the transmission of public keys to be used in asymmetric encryption, a system has been developed which is called Public Key Infrastructure (PKI). This system comprises servers in which the public keys are stored and from which a user needing a key can retrieve the key. Such a system is particularly applicable for use by companies, wherein the company itself does not need to transmit its public key to anyone who wishes to transmit information to the company in an encrypted manner.

Figure 6:
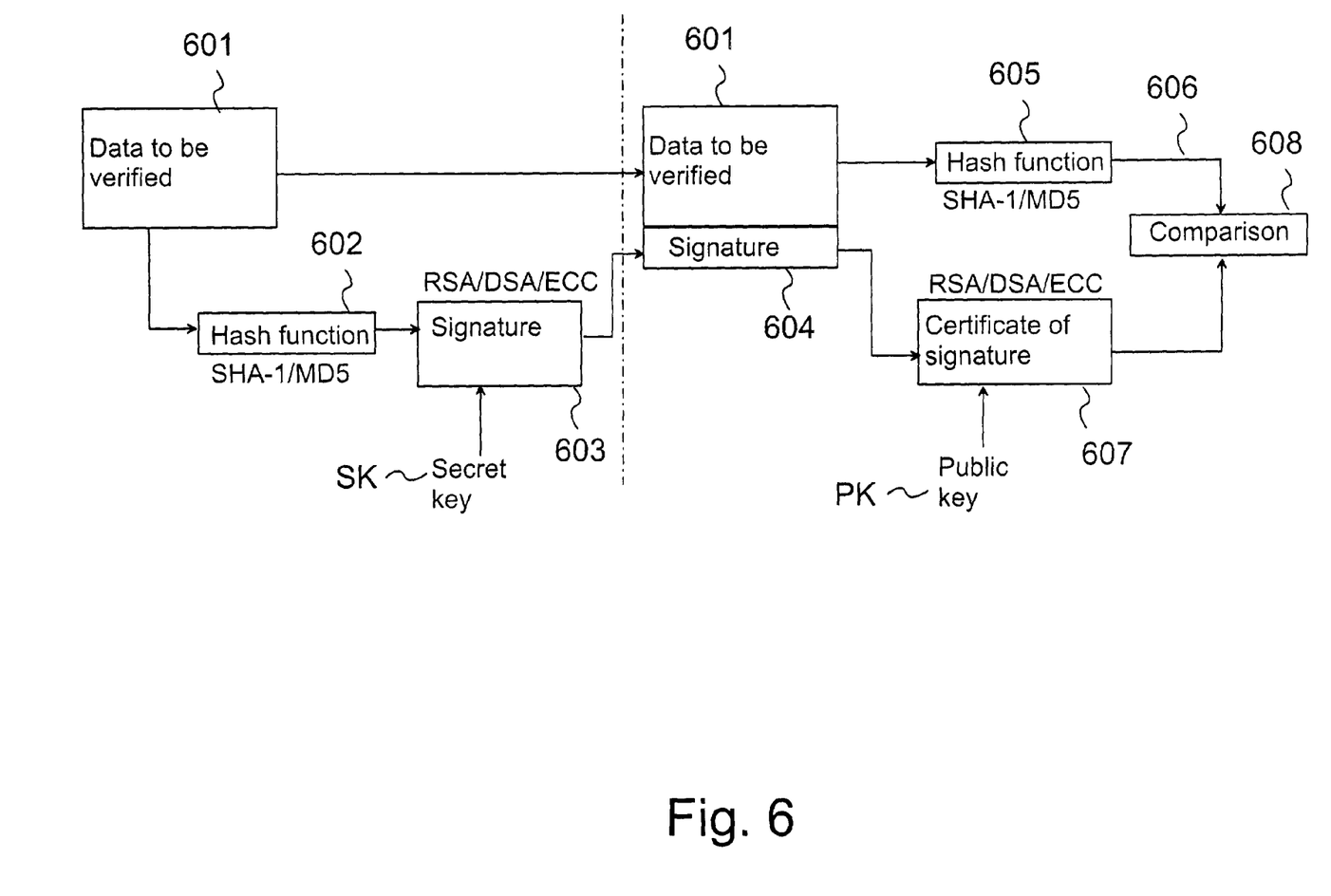
FIG. 6 shows a known principle on forming a digital signature.

For digital signatures, several systems have been used, such as the RSA, Digital Signatures Algorithm (DSA), and Elliptic Curve Cryptography (ECC). In connection with these systems, algorithms which compress the information to be signed are used, including Secure Hash Algorithm (SHA-1) and Message Digest 5 (MD5) to be mentioned in this context. FIG. 6 shows the forming of a digital signature in a principle view. The data 601 to be signed is led to a block 602 performing a hash function (compressing function). After this, the compressed data formed by the hash function is signed 603 with a secret key SK. The signature 604 is connected to the data 601 to be signed. At the stage of verifying the signed data, the data confirmed with the signature is led to a block 605 performing the hash function, for producing a hash code 606. The signature is verified 607 by using a public key PK corresponding to the signatory's secret key, after which the hash code 606 is compared 608 with the data formed in the verification 607 of the signature. If the data match, the signed data can be relied on with a high probability.

The steps according to the invention can be largely implemented with program commands of the central processing unit 2a, i.e., the means running the software in the control block 2 of the electronic device 1.

The invention can also be applied, for example, in the implementation of language versions of software related to the electronic device 1. Thus, for each language version, a set of programs is formed, containing the desired language definitions. The device identity is set as data in this set of programs, wherein the programs can only be used in a given device. To secure this, the mechanisms complying with the present inventions are applied. On the other hand, the solution of the invention can also be applied in such a way that it is possible to determine, in the electronic device 1, which language version or versions can be installed and run in said electronic device 1.

It should be understood that the present invention is not limited solely to the above-presented embodiments, but it can be modified within the scope of the appended claims.

The invention claimed is:

1. A method comprising:
beginning execution of a first boot block stored in a first memory as a first part of a boot-up process;
causing the first boot block to verify the trustworthiness of at least a portion of the first boot block;
when the trustworthiness of the at least a portion of the first boot block is not verified, terminating the boot-up process;
when the trustworthiness of the at least a portion of the first boot block is verified, continuing execution of the first boot block as part of the boot-up process;
causing the first boot block to verify the trustworthiness of at least a portion of a second boot block;
when the trustworthiness of the at least a portion of the second boot block is not verified, terminating the boot-up process;
when the trustworthiness of the at least a portion of the second boot block is verified, beginning execution of the second boot block to continue the boot-up process.

2. The method of claim 1, wherein the second boot block verifies the trustworthiness of at least a portion of one or more programs; when the trustworthiness of the at least a portion of the one or more programs is not verified, terminating the boot-up process; and when the trustworthiness of the at least a portion of the one or more programs is verified, starting execution of the one or more programs.

3. The method of claim 1, wherein verifying the trustworthiness of the at least a portion of the first boot block comprises calculating a digital signature of the at least a portion of the first boot block and comparing the first digital signature to a previously stored digital signature.

4. The method of claim 1, wherein the first boot block is stored in a read-only memory (ROM).

5. The method of claim 1, further comprising verifying the trustworthiness of an electronic device ID and, when the trustworthiness of the electronic device ID is not verified, terminating the boot-up process.

6. The method of claim 2, wherein at least one of the one or more programs provides mobile station functionality.

7. The method of claim 1, wherein the second boot block is stored in an electrically erasable programmable read-only memory (EEPROM).

8. The method of claim 1, wherein verifying the trustworthiness of the at least a portion of the first boot block comprises comparing a digital signature of the at least a portion of the first boot block with a previously-stored digital signature by using a public key stored in a read-only memory (ROM) to decrypt the previously-stored digital signature.

9. The method of claim 1, wherein verifying the trustworthiness of the at least a portion of the second boot block comprises comparing a digital signature of the at least a portion of the second boot block with a previously-stored digital signature by using a public key stored in a second memory to decrypt the previously-stored digital signature.

10. The method of claim 2, wherein verifying the trustworthiness of the at least a portion of the one or more programs comprises calculating a digital signature on the basis of device-specific data.

11. A method comprising:
storing into a first memory a first boot block comprising program code having instructions for verifying the trustworthiness of at least a portion of the first boot block, wherein the instructions of the first boot block, when executed, terminate a boot-up process when the trustworthiness of the at least a portion of the first boot block is not verified, and when the trustworthiness of the at least a portion of the first boot block is verified, verify the trustworthiness of at least a portion of a second boot block, and when the trustworthiness of the at least a portion of the second boot block is not verified, terminate the boot-up process and, when the trustworthiness of the at least a portion of the second boot block is verified, cause the second boot block to be executed;

storing into a second memory the second boot block, wherein the second boot block comprises program code for continuing the boot-up process.

12. The method of claim 11, wherein the second boot block comprises instructions for verifying the trustworthiness of at least a portion of one or more programs, wherein the instructions of the second boot block, when executed, terminate the boot-up process when the trustworthiness of at least a portion of the one or more programs is not verified and cause to be executed the one or more programs when the trustworthiness of the at least a portion of the one or more programs is verified.

13. The method of claim 11, wherein verifying the trustworthiness of the at least a portion of the first boot block comprises calculating a first digital signature of the at least a portion of the first boot block and comparing the first digital signature to a previously stored first digital signature.

14. The method of claim 11, wherein the first boot block is stored in a read-only memory (ROM).

15. The method of claim 11, further comprising storing an electronic device ID into a read-only memory, wherein the instructions of the first boot block further verify the trustworthiness of the electronic device ID.

16. The method of claim 12, wherein at least one of the one or more programs provides mobile station functionality.

17. The method of claim 11, wherein the second boot block is stored in an electrically erasable programmable read-only memory (EEPROM).

18. The method of claim 11, wherein verifying the trustworthiness of the at least a portion of the first boot block comprises comparing a digital signature of the at least a portion of the first boot block with a previously-stored digital signature by using a public key stored in a read-only memory (ROM) to decrypt the previously-stored first digital signature.

19. The method of claim 11, wherein verifying the trustworthiness of the at least a portion of the second boot block comprises comparing a digital signature of the at least a portion of the second boot block with a previously-stored digital signature by using a public key stored in a second memory to decrypt the previously-stored digital signature.

20. The method of claim 12, wherein the second boot block includes instructions that, when executed, calculates a digital signature on the basis of device-specific data.

21. One or more memories having embodied therein program code comprising instructions that, when executed, perform:
   beginning execution of a first boot block stored in a first memory as a first part of a boot-up process;
   causing the first boot block to verify the trustworthiness of at least a portion of the first boot block;
   when the trustworthiness of the at least a portion of the first boot block is not verified, terminating the boot-up process;
   when the trustworthiness of the at least a portion of the first boot block is verified, continuing execution of the first boot block as part of the boot-up process;
   causing the first boot block to verify the trustworthiness of at least a portion of a second boot block;
   when the trustworthiness of the at least a portion of the second boot block is not verified, terminating the boot-up process;
   when the trustworthiness of the at least a portion of the second boot block is verified, beginning execution of the second boot block.

22. The one or more memories of claim 21, wherein the second boot block includes instructions that verify the trustworthiness of at least a portion of one or more programs; when the trustworthiness of the at least a portion of the one or more programs is not verified, terminate the boot-up process; and when the trustworthiness of the at least a portion of the one or more programs is verified, start execution of the one or more programs.

23. The one or more memories of claim 21, wherein verifying the trustworthiness of the at least a portion of the first boot block comprises calculating a first digital signature and comparing the first digital signature to a previously stored first digital signature.

24. The one or more memories of claim 21, wherein the first boot block is stored in a read-only memory (ROM).

25. The one or more memories of claim 21, wherein the instructions verify the trustworthiness of an electronic device ID and, when the trustworthiness of the electronic device ID is not verified, terminating the boot-up process.

26. The one or more memories of claim 22, wherein at least one of the one or more programs provides mobile station functionality.

27. The one or more memories of claim 21, wherein the second boot block is stored in an electrically erasable programmable read-only memory (EEPROM).

28. The one or more memories of claim 21, wherein the instructions verify the trustworthiness of the at least a portion of the first boot block by comparing a digital signature of the at least a portion of the first boot block to a previously-stored digital signature using a public key stored in a read-only memory (ROM) to decrypt the previously-stored digital signature.

29. The one or more memories of claim 21, wherein the instructions verify the trustworthiness of the at least a portion of the second boot block by comparing a digital signature of the at least a portion of the second boot block to a previously-stored digital signature by using a public key stored in a second memory to decrypt the previously-stored digital signature.

30. The one or more memories of claim 22, wherein the instructions verify the trustworthiness of the at least a portion of the one or more programs by calculating a digital signature on the basis of device-specific data.

31. Apparatus comprising:
   a processor; and
   one or more memories comprising program code that, when executed, causes the apparatus to
   begin execution of a first boot block stored in a first memory as a first part of a boot-up process;
   cause the first boot block to verify the trustworthiness of at least a portion of the first boot block;
   when the trustworthiness of the at least a portion of the first boot block is not verified, terminate the boot-up process;
   when the trustworthiness of the at least a portion of the first boot block is verified, continue execution of the first boot block as part of the boot-up process;
   cause the first boot block to verify the trustworthiness of at least a portion of a second boot block;
   when the trustworthiness of the at least a portion of the second boot block is not verified, terminate the boot-up process;
   when the trustworthiness of the at least a portion of the second boot block is verified, begin execution of the second boot block.

32. The apparatus of claim 31, wherein the second boot block includes program code that verifies the trustworthiness of at least a portion of one or more programs; when the trustworthiness of the at least a portion of the one or more programs is not verified, terminating the boot-up process; and when the trustworthiness of the at least a portion of the one or more programs is verified, starting execution of the one or more programs.

33. The apparatus of claim 31, wherein verifying the trustworthiness of the at least a portion of the first boot block comprises calculating a digital signature and comparing the digital signature to a previously stored digital signature.

34. The apparatus of claim 31, wherein the first boot block is stored in a read-only memory (ROM).

35. The apparatus of claim 31, wherein the program code when executed further performs verifying the trustworthiness of an electronic device ID and, when the trustworthiness of the electronic device ID is not verified, terminating the boot-up process.

36. The apparatus of claim 32, wherein at least one of the one or more programs provides mobile station functionality.

37. The apparatus of claim 31, wherein the second boot block is stored in an electrically erasable programmable read-only memory (EEPROM).

38. The apparatus of claim 31, wherein the program code verifies the trustworthiness of the at least a portion of the first boot block by comparing a digital signature of the at least a portion of the first boot block with a previously-stored digital signature using a public key stored in a read-only memory (ROM) to decrypt the previously-stored digital signature.

39. The apparatus of claim 31, wherein the program code verifies the trustworthiness of the at least a portion of the second boot block by comparing a digital signature of the at least a portion of the second boot block with a previously-stored digital signature using a public key stored in a second memory to decrypt the previously-stored digital signature.

40. The apparatus of claim 32, wherein the program code verifies the trustworthiness of the at least a portion of the one or more programs by calculating a digital signature on the basis of device-specific data.

* * * * *